US005939513A

United States Patent [19]

Fredj et al.

[11] Patent Number: 5,939,513

[45] Date of Patent: *Aug. 17, 1999

[54] METHODS OF REMOVING PIGMENT STAIN USING DETERGENT COMPOSITIONS CONTAINING POLYAMINE N-OXIDE POLYMERS

[75] Inventors: Abdennaceur Fredj, Strombeek-Bever; Jean-Pol Boutique, Ernage, both of Belgium

[73] Assignee: The Procter & Gamble Company, Cincinnati, Ohio

[ * ] Notice: This patent is subject to a terminal disclaimer.

[21] Appl. No.: 08/669,547

[22] PCT Filed: Jan. 13, 1995

[86] PCT No.: PCT/US95/00625

§ 371 Date: Feb. 4, 1997

§ 102(e) Date: Feb. 4, 1997

[87] PCT Pub. No.: WO95/20031

PCT Pub. Date: Jul. 27, 1995

[30] Foreign Application Priority Data

Jan. 19, 1994 [AT] Austria ................................ 94870008

[51] Int. Cl.[6] .......................... C08F 26/06; C08G 12/00; D06B 1/00

[52] U.S. Cl. .......................... 528/229; 528/220; 528/223; 528/224; 528/310; 528/313; 528/327; 525/326.7; 510/220; 510/405; 8/137

[58] Field of Search .................................... 528/229, 220, 528/223, 224, 310, 313, 327; 525/326.7; 8/137; 510/220, 405

[56] References Cited

U.S. PATENT DOCUMENTS 3,159,611 12/1964 Dunn et al. ............................ 260/88.3
4,548,744 10/1985 Connor ................................... 252/545
5,009,980 4/1991 El-Sayed et al. ....................... 430/114
5,458,809 10/1995 Fredj et al. ............................ 252/542
5,604,197 2/1997 Busch et al. ........................... 510/516
5,624,666 4/1997 Coffindaffer et al. ................ 424/70.21
5,710,118 1/1998 Busch et al. ........................... 510/360
5,710,119 1/1998 Busch et al. ........................... 510/360
5,747,440 5/1998 Kellett et al. .......................... 510/276

FOREIGN PATENT DOCUMENTS 0 508 034 B1 10/1992 European Pat. Off. .......... C11D 3/37
0 579 295 A1 1/1994 European Pat. Off. .......... C11D 3/00
1097450 1/1968 United Kingdom ............ A61K 3/74

*Primary Examiner*—P. Hampton-Hightower
*Attorney, Agent, or Firm*—Jacobus C. Rasser; Kim W. Zerby; Pankaj M. Khosla

[57] ABSTRACT

Methods of removing a pigment stain from a substrate comprise cleaning the substrate with a detergent composition comprising polyamine N-oxide polymer formed of units having structural formula (I)

(I)

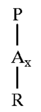

wherein P is a polymerizable unit, the N—O group may be attached to or form part of P, A is

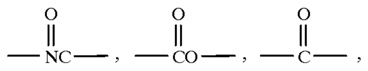

—O—, —S—, or —N—; —x— is 0 or 1; and R is an aliphatic, ethoxylated aliphatic, aromatic, heterocyclic or alicyclic group and the nitrogen of the N—O group may be attached to or from part of R.

17 Claims, No Drawings

METHODS OF REMOVING PIGMENT STAIN USING DETERGENT COMPOSITIONS CONTAINING POLYAMINE N-OXIDE POLYMERS

FIELD OF THE INVENTION

The present invention relates to detergent compositions containing polyamine N-oxide polymers. More in particular, the present invention relates to the use of polyamine N-oxide polymers for removal of pigment stains.

BACKGROUND OF THE INVENTION

For many years detergent compositions have contained chelating agents and/or bleaching agents for removal of pigment stains such as tea, coffee, wine and fruit stains on household laundry.

Chelants react with the heavy metals present in such stains, thereby providing stain removal performance benefits by extraction of the metal ions from the stains.

Phosphorus-containing compounds have proven to be very useful as chelating agents. However, there is a growing concern regarding the use of phosphorus-containing compounds in detergent compositions because such compounds lead to the eutrophication of lakes and streams. This has urged the detergent formulator to restrict the phosphorus content of detergent compositions, necessitating the formulation of laundry detergents containing chelants less effective than the conventionally-used phosphonates or polyphosphonates. These requirements have complicated the formulation of effective detergent compositions in terms of cleaning efficiency in general and stain removal in particular. It would, therefore, be highly desirable to be able to formulate detergent compositions which include reduced levels of phosphorous-containing components, but which still exhibit excellent cleaning and stain removal performance. It has now been found that certain polyamine-N-oxide polymers are very efficient in removing pigment stains. This finding allows to formulate detergent compositions exhibiting excellent cleaning and stain removal performance.

SUMMARY OF THE INVENTION

The present invention relates to detergent compositions comprising polyamine N-oxide polymers which contain units having the following structure formula:

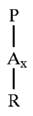

wherein P is a polymerisable unit, whereto the N—O group can be attached to or wherein the N—O group forms part of the polymerisable unit or a combination of both.

A is

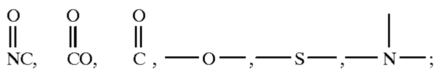

x is 0 or 1;

R are aliphatic, ethoxylated aliphatics, aromatic, heterocyclic or alicyclic groups or any combination thereof whereto the nitrogen of the N—O group can be attached or wherein the nitrogen of the N—O group form part of these groups.

DETAILED DESCRIPTION OF THE INVENTION

The compositions of the present invention comprise as an essential element polyamine N-oxide polymers which contain units having the following structure formula:

(I)

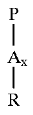

wherein P is a polymerisable unit, whereto the N—O group can be attached to or wherein the N—O group forms part of the polymerisable unit or a combination of both.

A is

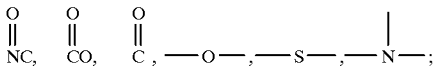

x is 0 or 1;

R are aliphatic, ethoxylated aliphatics, aromatic, heterocyclic or alicyclic groups or any combination thereof whereto the nitrogen of the N—O group can be attached or wherein the nitrogen of the N—O group is part of these groups.

The N—O group can be represented by the following general structures:

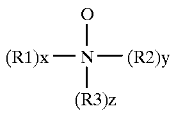

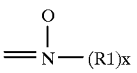

wherein R1, R2, R3 are aliphatic groups, aromatic, heterocyclic or alicyclic groups or combinations thereof, x or/and y or/and z is 0 or 1 and wherein the nitrogen of the N—O group can be attached or wherein the nitrogen of the N—O group forms part of these groups.

The N—O group can be part of the polymerisable unit (P) or can be attached to the polymeric backbone or a combination of both.

Suitable polyamine N-oxides wherein the N—O group forms part of the polymerisable unit comprise polyamine N-oxides wherein R is selected from aliphatic, aromatic, alicyclic or heterocyclic groups. One class of said polyamine N-oxides comprises the group of polyamine N-oxides wherein the nitrogen of the N—O group forms part of the R-group. Preferred polyamine N-oxides are those wherein R is a heterocyclic group such as pyrridine, pyrrole, imidazole, pyrrolidine, piperidine, quinoline, acridine and derivatives thereof. Another class of said polyamine N-oxides comprises the group of polyamine N-oxides wherein the nitrogen of the N—O group is attached to the R-group.

Other suitable polyamine N-oxides are the polyamine oxides whereto the N—O group is attached to the polymerisable unit. Preferred class of these polyamine N-oxides are the polyamine N-oxides having the general formula (I) wherein R is an aromatic, heterocyclic or alicyclic groups wherein the nitrogen of the N—O functional group is part of said R group. Examples of these classes are polyamine oxides wherein R is a heterocyclic compound such as pyrridine, pyrrole, imidazole and derivatives thereof.

Another preferred class of polyamine N-oxides are the polyamine oxides having the general formula (I) wherein R are aromatic, heterocyclic or alicyclic groups wherein the nitrogen of the N—O functional group is attached to said R groups.

Examples of these classes are polyamine oxides wherein R groups can be aromatic such as phenyl.

Any polymer backbone can be used as long as the amine oxide polymer formed is water-soluble. Examples of suitable polymeric backbones are polyvinyls, polyalkylenes, polyesters, polyethers, polyamide, polyimides, polyacrylates and mixtures thereof.

The amine N-oxide polymers of the present invention typically have a ratio of amine to the amine N-oxide of 10:1 to 1:1000000. However the amount of amine oxide groups present in the polyamine oxide polymer can be varied by appropriate copolymerization or by appropriate degree of N-oxidation. Preferably, the ratio of amine to amine N-oxide is from 2:3 to 1:1000000. More preferably from 1:4 to 1:1000000, most preferably from 1:7 to 1:1000000. The polymers of the present invention actually encompass random or block copolymers where one monomer type is an amine N-oxide and the other monomer type is either an amine N-oxide or not. The amine oxide unit of the polyamine N-oxides has a PKa<10, preferably PKa<7, more preferred PKa<6.

The polyamine oxides can be obtained in almost any degree of polymerisation. The degree of polymerisation is not critical provided the material has the desired water-solubility and soil-suspending power. Typically, the average molecular weight is within the range of 5,000 to 1000,000; preferably from 5,000 to 100,000, more preferably from 10,000 to 100,000, most preferably from 30,000 to 50,000.

Typically, the polyamine N-oxides of the present invention are present from 0.01% to 10%, more preferably from 0.05% to 5%, most preferably from 0.1% to 3% (by weight of the detergent composition.)

Methods for making polyamine N-oxides

The production of the polyamine-N-oxides may be accomplished by polymerizing the amine monomer and oxidizing the resultant polymer with a suitable oxidizing agent, or the amine oxide monomer may itself be polymerized to obtain the polyamine N-oxide. The synthesis of polyamine N-oxide can be exemplified by the synthesis of polyvinyl-pyridine N-oxide. Poly-4-vinylpyridine ex Polysciences (mw. 50 000, 5.0 g., 0.0475 mole) was predisolved in 50 ml acetic acid and treated with a peracetic acid solution (25 g of glacial acetic acid, 6.4 g of a 30% vol. solution of $H_2O_2$, and a few drops of $H_2SO_4$ give 0.0523 mols of peracetic acid) via a pipette. The mixture was stirred over 30 minutes at ambient temperature (32 C.). The mixture was then heated to 80–85 C. using an oil bath for 3 hours before allowing to stand overnight. The polymer solution then obtained is mixed with 11 of acetone under agitation. The resulting yellow brown viscous syrup formed on the bottom is washed again with 11 of aceton to yield a pale crystalline solid. The solid was filtered off by gravity, washed with acetone and then dried over $P_2O_5$. The amine: amine N-oxide ratio of this polymer is 1:4.

DETERGENT ADJUNCTS

A wide range of surfactants can be used in the detergent compositions. A typical listing of anionic, nonionic, ampholytic and zwitterionic classes, and species of these surfactants, is given in U.S. Pat. No. 3,664,961 issued to Norris on May 23, 1972.

Mixtures of anionic surfactants are particularly suitable herein, especially mixtures of sulphonate and sulphate surfactants in a weight ratio of from 5:1 to 1:2, preferably from 3:1 to 2:3, more preferably from 3:1 to 1:1. Preferred sulphonates include alkyl benzene sulphonates having from 9 to 15, especially 11 to 13 carbon atoms in the alkyl radical, and alpha-sulphonated methyl fatty acid esters in which the fatty acid is derived from a $C_{12}$–$C_{18}$ fatty source preferably from a $C_{16}$–$C_{18}$ fatty source. In each instance the cation is an alkali metal, preferably sodium. Preferred sulphate surfactants are alkyl sulphates having from 12 to 18 carbon atoms in the alkyl radical, optionally in admixture with ethoxy sulphates having from 10 to 20, preferably 10 to 16 carbon atoms in the alkyl radical and an average degree of ethoxylation of 1 to 6. Examples of preferred alkyl sulphates herein are tallow alkyl sulphate, coconut alkyl sulphate, and $C_{14-15}$ alkyl sulphates. The cation in each instance is again an alkali metal cation, preferably sodium.

One class of nonionic surfactants useful in the present invention are condensates of ethylene oxide with a hydrophobic moiety to provide a surfactant having an average hydrophilic-lipophilic balance (HLB) in the range from 8 to 17, preferably from 9.5 to 13.5, more preferably from 10 to 12.5. The hydrophobic (lipophilic) moiety may be aliphatic or aromatic in nature and the length of the polyoxyethylene group which is condensed with any particular hydrophobic group can be readily adjusted to yield a water-soluble compound having the desired degree of balance between hydrophilic and hydrophobic elements.

Especially preferred nonionic surfactants of this type are the $C_9$–$C_{15}$ primary alcohol ethoxylates containing 3–8 moles of ethylene oxide per mole of alcohol, particularly the $C_{14}$–$C_{15}$ primary alcohols containing 6–8 moles of ethylene oxide per mole of alcohol and the $C_{12}$–$C_{14}$ primary alcohols containing 3–5 moles of ethylene oxide per mole of alcohol.

Another class of nonionic surfactants comprises alkyl polyglucoside compounds of general formula $$RO(C_nH_{2n}O)_tZ_x$$

wherein Z is a moiety derived from glucose; R is a saturated hydrophobic alkyl group that contains from 12 to 18 carbon atoms; t is from 0 to 10 and n is 2 or 3; x is from 1.3 to 4, the compounds including less than 10% unreacted fatty alcohol and less than 50% short chain alkyl polyglucosides. Compounds of this type and their use in detergent are disclosed in EP-B 0 070 077, 0 075 996 and 0 094 118.

Also suitable as nonionic surfactants are poly hydroxy fatty acid amide surfactants of the formula

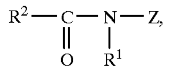

wherein $R^1$ is H, or $R^1$ is $C_{1-4}$ hydrocarbyl, 2-hydroxy ethyl, 2-hydroxy propyl or a mixture thereof, $R^2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R^1$ is methyl, $R^2$ is a straight $C_{11-15}$ alkyl or alkenyl chain such as coconut alkyl or mixtures thereof, and Z is derived from a reducing sugar such as glucose, fructose, maltose, lactose, in a reductive amination reaction.

The compositions according to the present invention may further comprise a builder system. Any conventional builder system is suitable for use herein including aluminosilicate materials, silicates, polycarboxylates and fatty acids, materials such as ethylenediamine tetraacetate, metal ion sequestrants such as aminopolyphosphonates, particularly ethylenediamine tetramethylene phosphonic acid and diethylene triamine pentamethylenephosphonic acid. Suitable builders can be an inorganic ion exchange material, commonly an inorganic hydrated aluminosilicate material, more particularly a hydrated synthetic zeolite such as hydrated zeolite A, X, B or HS. Another suitable inorganic builder material is layered silicate, e.g. SKS-6 (Hoechst). SKS-6 is a crystalline layered silicate consisting of sodium silicate ($Na_2Si_2O_5$).

Suitable polycarboxylates containing one carboxy group include lactic acid, glycolic acid and ether derivatives thereof as disclosed in Belgian Patent Nos. 831,368, 821,369 and 821,370. Polycarboxylates containing two carboxy groups include the water-soluble salts of succinic acid, malonic acid, (ethylenedioxy) diacetic acid, maleic acid, diglycollic acid, tartaric acid, tartronic acid and fumaric acid, as well as the ether carboxylates described in German Offenlegenschrift 2,446,686, and 2,446,687 and U.S. Pat. No. 3,935,257 and the sulfinyl carboxylates described in Belgian Patent No. 840,623. Polycarboxylates containing three carboxy groups include, in particular, water-soluble citrates, aconitrates and citraconates as well as succinate derivatives such as the carboxymethyloxysuccinates described in British Patent No. 1,379,241, lactoxysuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in British Patent Nos. 1,398,421 and 1,398,422 and in U.S. Pat. No. 3,936,448, and the sulfonated pyrolysed citrates described in British Patent No. 1,082,179, while polycarboxylates containing phosphone substituents are disclosed in British Patent No. 1,439,000.

Alicyclic and heterocyclic polycarboxylates include cyclopentane-cis,cis,cis-tetracarboxylates, cyclopentadienide pentacarboxylates, 2,3,4,5-tetrahydrofuran-cis,cis,cis-tetracarboxylates, 2,5-tetrahydrofuran-cis-dicarboxylates, 2,2,5,5-tetrahydrofuran-tetracarboxylates, 1,2,3,4,5,6-hexane-hexacarboxylates and carboxymethyl derivatives of polyhydric alcohols such as sorbitol, mannitol and xylitol. Aromatic polycarboxylates include mellitic acid, pyromellitic acid and the phtalic acid derivatives disclosed in British Patent No. 1,425,343.

Of the above, the preferred polycarboxylates are hydroxycarboxylates containing up to three carboxy groups per molecule, more particularly citrates. Preferred builder systems for use in the present compositions include a mixture of a water-insoluble aluminosilicate builder such as zeolite A or of a layered silicate (sks/6), and a water-soluble carboxylate chelating agent such as citric acid.

Another suitable chelant for inclusion in the detergent compositions in addition to the polyamine N-oxide polymers is ethylenediamine-N,N'-disuccinic acid (EDDS) or the alkali metal, alkaline earth metal, ammonium, or substituted ammonium salts thereof, or mixtures thereof. Preferred EDDS compounds are the free acid form and the sodium or magnesium salt thereof. Examples of such preferred sodium salts of EDDS include $Na_2EDDS$ and $Na_4EDDS$. Examples of such preferred magnesium salts of EDDS include MgEDDS and $Mg_2EDDS$. The magnesium salts are the most preferred for inclusion in compositions in accordance with compositions of the present invention containing bleaching agents.

Especially for the liquid execution herein, suitable fatty acid builders for use herein are saturated or unsaturated C10–18 fatty acids, as well as well as the corresponding soaps. Preferred saturated species have from 12 to 16 carbon atoms in the alkyl chain. The preferred unsaturated fatty acid is oleic acid. Preferred builder systems for use in granular compositions include a mixture of a water-insoluble aluminosilicate builder such as zeolite A, and a water-soluble carboxylate chelating agent such as citric acid. Other builder materials that can form part of the builder system for use in granular compositions the purposes of the invention include inorganic materials such as alkali metal carbonates, bicarbonates, silicates, and organic materials such as the organic phosphonates, amiono polyalkylene phosphonates and amino polycarboxylates. Other suitable water-soluble organic salts are the homo- or co-polymeric acids or their salts, in which the polycarboxylic acid comprises at least two carboxyl radicals separated from each other by not more than two carbon atoms. Polymers of this type are disclosed in GB-A-1,596,756. Examples of such salts are polyacrylates of MW 2000–5000 and their copolymers with maleic anhydride, such copolymers having a molecular weight of from 20,000 to 70,000, especially about 40,000.

Detergency builder salts are normally included in amounts of from 10% to 80% by weight of the composition preferably from 20% to 70% and most usually from 30% to 60% by weight.

Detergent ingredients that can be included in the detergent compositions of the present invention include bleaching agents. These bleaching agent components can include one or more oxygen bleaching agents and, depending upon the bleaching agent chosen, one or more bleach activators. When present bleaching compounds will typically be present at levels of from about 1% to about 10%, of the detergent composition. In general, bleaching compounds are optional components in non-liquid formulations, e.g. granular detergents. If present, the amount of bleach activators will typically be from about 0.1% to about 60%, more typically from about 0.5% to about 40% of the bleaching composition.

The bleaching agent component for use herein can be any of the bleaching agents useful for detergent compositions including oxygen bleaches as well as others known in the art.

In a method aspect, this invention further provides a method for cleaning fabrics, fibers, textiles, at temperatures below about 50° C., especially below about 40° C., with a detergent composition containing polyamine N-oxide containing polymers, optional auxiliary detersive surfactants, optional detersive adjunct ingredients, and a bleaching agent. The bleaching agent suitable for the present invention can be an activated or non-activated bleaching agent.

One category of oxygen bleaching agent that can be used encompasses percarboxylic acid bleaching agents and salts thereof. Suitable examples of this class of agents include magnesium monoperoxyphthalate hexahydrate, the magnesium salt of meta-chloro perbenzoic acid, 4-nonylamino-4-oxoperoxybutyric acid and diperoxydodecanedioic acid. Such bleaching agents are disclosed in U.S. Pat. No. 4,483,781, U.S. patent application Ser. No. 740,446, European Patent Application 0,133,354 and U.S. Pat. No. 4,412,934. Highly preferred bleaching agents also include 6-nonylamino-6-oxoperoxycaproic acid as described in U.S. Pat. No. 4,634,551.

Another category of bleaching agents that can be used encompasses the halogen bleaching agents. Examples of hypohalite bleaching agents, for example, include trichloro isocyanuric acid and the sodium and potassium dichloroisocyanurates and N-chloro and N-bromo alkane sulphonamides. Such materials are normally added at 0.5–10% by weight of the finished product, preferably 1–5% by weight.

Preferably, the bleaches suitable for the present invention include peroxygen bleaches. Examples of suitable water-soluble solid peroxygen bleaches include hydrogen peroxide releasing agents such as hydrogen peroxide, perborates, e.g. perborate monohydrate, perborate tetrahydrate, persulfates, percarbonates, peroxydisulfates, perphosphates and peroxyhydrates. Preferred bleaches are percarbonates and perborates.

The hydrogen peroxide releasing agents can be used in combination with bleach activators such as tetraacetylethylenediamine (TAED), nonanoyloxybenzenesulfonate (NOBS, described in U.S. Pat. No. 4,412,934), 3,5,-trimethylhexanoloxybenzenesulfonate (ISONOBS, described in EP 120,591) or pentaacetylglucose (PAG), which are perhydrolyzed to form a peracid as the active bleaching species, leading to improved bleaching effect. Also suitable activators are acylated citrate esters (ATC) such as disclosed in Copending European Patent Application No. 91870207.7.

The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

Other peroxygen bleaches suitable for the present invention include organic peroxyacids such as percarboxylic acids.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. These materials can be deposited upon the substrate during the washing process. Upon irradiation with light, in the presence of oxygen, such as by hanging clothes out to dry in the daylight, the sulfonated zinc phthalocyanine is activated and, consequently, the substrate is bleached. Preferred zinc phthalocyanine and a photoactivated bleaching process are described in U.S. Pat. No. 4,033,718. Typically, detergent compositions will contain about 0.025% to about 1.25%, by weight, of sulfonated zinc phthalocyanine.

Other detergent ingredients that can be included are detersive enzymes which can be included in the detergent formulations for a wide variety of purposes including removal of protein-based, carbohydrate-based, or triglyceride-based stains, for example, and prevention of refugee dye transfer. The enzymes to be incorporated include proteases, amylases, lipases, cellulases, and peroxidases, as well as mixtures thereof. Other types of enzymes may also be included. They may be of any suitable origin, such as vegetable, animal, bacterial, fungal and yeast origin.

Enzymes are normally incorporated at levels sufficient to provide up to about 5 mg by weight, more typically about 0.05 mg to about 3 mg, of active enzyme per gram of the composition.

Suitable examples of proteases are the subtilisins which are obtained from particular strains of *B. subtilis* and *B. licheniforms*. Proteolytic enzymes suitable for removing protein-based stains that are commercially available include those sold under the tradenames Alcalase, Savinase and Esperase by Novo Industries A/S (Denmark) and Maxatase by International Bio-Synthetics, Inc. (The Netherlands) and FN-base by Genencor, Optimase and opticlean by MKC.

Of interest in the category of proteolytic enzymes, especially for liquid detergent compositions, are enzymes referred to herein as Protease A and Protease B. Protease A is described in European Patent Application 130,756. Protease B is described in European Patent Application Serial No. 87303761.8. Amylases include, for example, -amylases obtained from a special strain of *B. licheniforms*, described in more detail in British Patent Specification No. 1,296,839 (Novo). Amylolytic proteins include, for example, Rapidase, Maxamyl (International Bio-Synthetics, Inc.) and Termamyl, (Novo Industries).

The cellulases usable in the present invention include both bacterial or fungal cellulase. Preferably, they will have a pH optimum of between 5 and 9.5. Suitable cellulases are disclosed in U.S. Pat. No. 4,435,307, Barbesgoard et al, which discloses fungal cellulase produced from *Humicola insolens*. Suitable cellulases are also disclosed in GB-A-2.075.028; GB-A-2.095.275 and DE-OS-2.247.832.

Examples of such cellulases are cellulases produced by a strain of *Humicola insolens* (*Humicola grisea* var.

thermoidea), particularly the Humicola strain DSM 1800, and cellulases produced by a fungus of Bacillus N or a cellulase 212-producing fungus belonging to the genus Aeromonas, and cellulase extracted from the hepatopancreas of a marine mollusc (Dolabella Auricula Solander). Other suitable cellulases are cellulases originated from *Humicola insulens* having a molecular weight of about 50 KDa, an isoelectric point of 5.5 and containing 415 amino acids. Such cellulase are described in Copending European patent application No. 93200811.3, filed Mar. 19, 1993. Especially suitable cellulase are the cellulase having color care benefits. Examples of such cellulases are cellulase described in European patent application No. 91202879.2, filed Nov. 6, 1991 Carezyme (Novo).

Suitable lipase enzymes for detergent usage include those produced by microorganisms of the Pseudomonas group, such as *Pseudomonas stutzeri* ATCC 19.154, as disclosed in British Patent 1,372,034. Suitable lipases include those which show a positive immunoligical cross-reaction with the antibody of the lipase, produced by the microorganism *Pseudomonas fluorescent* IAM 1057. This lipase is available from Amano Pharmaceutical Co. Ltd., Nagoya, Japan, under the trade name Lipase P "Amano," hereinafter referred to as "Amano-P". Especially suitable Lipase are lipase such as Ml Lipase (Ibis) and Lipolase (Novo).

Peroxidase enzymes are used in combination with oxygen sources, e.g. percarbonate, perborate, persulfate, hydrogen peroxide, etc. They are used for "solution bleaching", i.e. to prevent transfer of dyes of pigments removed from substrates during wash operations to other substrates in the wash solution. Peroxidase enzymes are known in the art, and include, for example, horseradish peroxidase, ligninase, and haloperoxidase such as chloro- and bromo-peroxidase. Peroxidase-containing detergent compositions are disclosed, for example, in PCT Internation Application WO 89/099813 and in European Patent application EP No. 91202882.6, filed on Nov. 6, 1991. In liquid formulations, an enzyme stabilization system is preferably utilized. Enzyme stabilization techniques for aqueous detergent compositions are well known in the art. For example, one technique for enzyme stabilization in aqueous solutions involves the use of free calcium ions from sources such as calcium acetate, calcium formate and calcium propionate. Calcium ions can be used in combination with short chain carboxylic acid salts, preferably formates. See, for example, U.S. Pat. No. 4,318,818. It has also been proposed to use polyols like glycerol and sorbitol. Alkoxy-alcohols, dialkylglycoethers, mixtures of polyvalent alcohols with polyfunctional aliphatic amines (e.g., such as diethanolamine, triethanolamine, di-isopropanolamime, etc.), and boric acid or alkali metal borate. Enzyme stabilization techniques are additionally disclosed and exemplified in U.S. Pat. No. 4,261,868, U.S. Pat. No. 3,600,319, and European Patent Application Publication No. 0 199 405, Application No. 86200586.5. Non-boric acid and borate stabilizers are preferred. Enzyme stabilization systems are also described, for example, in U.S. Pat. Nos. 4,261,868, 3,600,319 and 3,519,570. Other suitable detergent ingredients that can be added are enzyme oxidation scavengers which are described in Copending European Patent aplication N 92870018.6 filed on Jan. 31, 1992. Examples of such enzyme oxidation scavengers are ethoxylated tetraethylene polyamines. Especially preferred detergent ingredients are combinations with technologies which also provide a type of color care benefit. Examples of these technologies are cellulase and/or peroxidases and/or metallo catalysts for color maintance rejuvenation.

Another optional ingredient is a suds suppressor, exemplified by silicones, and silica-silicone mixtures. Silicones can be generally represented by alkylated polysiloxane materials while silica is normally used in finely divided forms exemplified by silica aerogels and xerogels and hydrophobic silicas of various types. These materials can be incorporated as particulates in which the suds suppressor is advantageously releasably incorporated in a water-soluble or water-dispersible, substantially non-surface-active detergent impermeable carrier. Alternatively the suds suppressor can be dissolved or dispersed in a liquid carrier and applied by spraying on to one or more of the other components.

A preferred silicone suds controlling agent is disclosed in Bartollota et al. U.S. Pat. No. 3,933,672. Other particularly useful suds suppressors are the self-emulsifying silicone suds suppressors, described in German Patent Application DTOS 2 646 126 published Apr. 28, 1977. An example of such a compound is DC-544, commercially available from Dow Corning, which is a siloxane-glycol copolymer. Especially preferred suds controlling agent are the suds suppressor system comprising a mixture of silicone oils and 2-alkyl-alcanols. Suitable 2-alkyl-alcanols are 2-butyl-octanol which are commercially available under the trade name Isofol 12 R. Such suds suppressor system are described in Copending European Patent application N 92870174.7 filed Nov. 10, 1992.

Especially preferred silicone suds controlling agents are described in Copending European Patent application N°92201649.8. Said compositions can comprise a silicone/silica mixture in combination with fumed nonporous silica such as Aerosil®.

The suds suppressors described above are normally employed at levels of from 0.001% to 2% by weight of the composition, preferably from 0.01% to 1% by weight.

Other components used in detergent compositions may be employed, such as soil-suspending agents soil-release agents, optical brighteners, abrasives, bactericides, tarnish inhibitors, coloring agents, and non-encapsulated and encapsulated perfumes.

Antiredeposition and soil suspension agents suitable herein include cellulose derivatives such as methylcellulose, carboxymethylcellulose and hydroxyethylcellulose, and homo- or co-polymeric polycarboxylic acids or their salts. Polymers of this type include the polyacrylates and maleic anhydride-acrylic acid copolymers previously mentioned as builders, as well as copolymers of maleic anhydride with ethylene, methylvinyl ether or methacrylic acid, the maleic anhydride constituting at least 20 mole percent of the copolymer. These materials are normally used at levels of from 0.5% to 10% by weight, more preferably from 0.75% to 8%, most preferably from 1% to 6% by weight of the composition.

Preferred optical brighteners are anionic in character, examples of which are disodium 4,4$^1$-bis-(2-diethanolamino-4-anilino-s-triazin-6-ylamino)stilbene-2:2$^1$ disulphonate, disodium 4,-4$^1$-bis-(2-morpholino-4-anilino-s-triazin-6-ylaminostilbene-2:2$^1$-disulphonate, disodium 4,4$^1$-bis-(2,4-dianilino-s-triazin-6-ylamino)stilbene-2:2$^1$-disulphonate, monosodium 4$^1$,4$^{11}$-bis-(2,4-dianilino-s-triazin-6 ylamino)stilbene-2-sulphonate, disodium 4,4$^1$-bis-(2-anilino-4-(N-methyl-N-2-hydroxyethylamino)-s-triazin-6-ylamino)stilbene-2,2$^1$-disulphonate, disodium 4,4$^1$-bis-(4-phenyl-2,1,3-triazol-2-yl)-stilbene-2,2$^1$disulphonate, disodium 4,4$^1$bis(2-anilino-4-(1-methyl-2-hydroxyethylamino)-s-triazin-6-ylamino)stilbene-2, 2$^1$disulphonate and sodium 2(stilbyl-4$^{11}$-(naphtho-1$^1$,2$^1$:4, 5)-1,2,3-triazole-2$^{11}$-sulphonate.

Other useful polymeric materials are the polyethylene glycols, particularly those of molecular weight 1000–10000, more particularly 2000 to 8000 and most preferably about 4000. These are used at levels of from 0.20% to 5% more preferably from 0.25% to 2.5% by weight. These polymers and the previously mentioned homo- or co-polymeric polycarboxylate salts are valuable for improving whiteness maintenance, fabric ash deposition, and cleaning performance on clay, proteinaceous and oxidizable soils in the presence of transition metal impurities.

Soil release agents useful in compositions of the present invention are conventionally copolymers or terpolymers of terephthalic acid with ethylene glycol and/or propylene glycol units in various arrangements. Examples of such polymers are disclosed in the commonly assigned U.S. Pat. Nos. 4,116,885 and 4,711,730 and European Published Patent Application No. 0 272 033. A particular preferred polymer in accordance with EP-A-0 272 033 has the formula $$(CH_3(PEG)_{43})_{0.75}(POH)_{0.25}[T\text{-}PO)_{2.8}(T\text{-}PEG)_{0.4}]$$
$$T(POH)_{0.25}((PEG)_{43}CH_3)_{0.75}$$

where PEG is—$(OC_2H_4)O$—,PO is $(OC_3H_6O)$ and T is $(pcOC_6H_4CO)$.

Also very useful are modified polyesters as random copolymers of dimethyl terephtalate, dimethyl sulfoisophtalate, ethylene glycol and 1–2 propanediol, the end groups consisting primarily of sulphobenzoate and secondarily of mono esters of ethylene glycol and/or propanediol. The target is to obtain a polymer capped at both end by sulphobenzoate groups, "primarily", in the present context most of said copolymers herein will be end-capped by sulphobenzoate groups. However, some copolymers will be less than fully capped, and therefore their end groups may consist of monoester of ethylene glycol and/or propane 1-2 diol, thereof consist "secondarily" of such species.

The selected polyesters herein contain about 46% by weight of dimethyl terephtalic acid, about 16% by weight of propane−1.2 diol, about 10% by weight ethylene glycol about 13% by weight of dimethyl sulfobenzoid acid and about 15% by weight of sulfoisophtalic acid, and have a molecular weight of about 3.000. The polyesters and their method of preparation are described in detail in EPA 311 342.

The detergent compositions according to the invention can be in liquid, paste, gel or granular forms. Granular compositions according to the present invention can also be in "compact form", i.e. they may have a relatively higher density than conventional granular detergents, i.e. from 550 to 950 g/l; in such case, the granular detergent compositions according to the present invention will contain a lower amount of "inorganic filler salt", compared to conventional granular detergents; typical filler salts are alkaline earth metal salts of sulphates and chlorides, typically sodium sulphate; "compact" detergents typically comprise not more than 10% filler salt. The liquid compositions according to the present invention can also be in "concentrated form", in such case, the liquid detergent compositions according to the present invention will contain a lower amount of water, compared to conventional liquid detergents. Typically, the water content of the concentrated liquid detergent is less than 30%, more preferably less than 20%, most preferably less than 10% by weight of the detergent compositions.

The present invention also relates to a process for inhibiting dye transfer from one fabric to another of solubilized and suspended dyes encountered during fabric laundering operations involving colored fabrics.

The process comprises contacting fabrics with a laundering solution as hereinbefore described.

The process of the invention is conveniently carried out in the course of the washing process. The washing process is preferably carried out at 5° C. to 75° C., especially 20 to 60, but the polymers are effective at up to 95° C. and higher temperatures. The pH of the treatment solution is preferably from 7 to 11, especially from 7.5 to 10.5.

The process and compositions of the invention can also be used as detergent additive products. Such additive products are intended to supplement or boost the performance of conventional detergent compositions. The detergent compositions according to the present invention include compositions which are to be used for cleaning substrates, such as fabrics, fibers, hard surfaces, skin etc., for example hard surface cleaning compositions (with or without abrasives), laundry detergent compositions, automatic and non automatic dishwashing compositions.

The following examples are meant to exemplify compositions of the present invention, but are not necessarily meant to limit or otherwise define the scope of the invention, said scope being determined according to claims which follow.

A liquid detergent composition having the following composition is made:

TABLE I

| % by weight of the total detergent composition | |
|---|---|
| $C_{12-14}$ alkyl sulfate | 21 |
| $C_{13-15}$ alkyl ethoxy (3EO) sulfate | 3 |
| Fatty alcohol $C_{12-14}$ ethoxylate (7EO) | 6 |
| $C_{12}$ N-methyl glucamide | 9 |
| Fatty acids | 14 |
| Citric acid | 3.5 |
| Monoethanolamine | 11 |
| Propanediol | 8 |
| Ethanol | 6 |
| Diethylene triamine penta methylene phosphonic acid | 1.9 |
| NaOH | up to pH 7.8 |
| Water and minors | up to 100% |

EXAMPLE I

A laundry test was made under the following conditions: 60° C. temperature, 75 mls product usage, city water, soiled loads.

Product A is a detergent composition according to Table I which does not contain polyamine N-oxide polymer.

Product B is a detergent composition according to Table I containing 0.3% of poly(4-vinylpyrridine N-oxide) which has an average molecular weight of about 50 000 and an amine to amine N-oxide ratio of 1:4.

Results: Panel score unit difference (cotton)

| | B vs. A |
|---|---|
| Tea | +0.8 (s) |
| Coffee | +0.5 (s) |

EXAMPLE II

A liquid detergent composition according to the present invention is prepared, having the following compositions:

| % by weight of the total detergent composition | |
|---|---|
| $C_{13-15}$ alkyl ethoxy (3EO) sulfate | 19 |
| Fatty alcohol $C_{12-14}$ ethoxylate (7EO) | 6 |
| $C_{12}$ N-methyl glucamide | 9 |
| Fatty acids | 9 |
| Citric acid | 6 |
| Monoethanolamine | 12 |
| Propanediol | 10 |
| Ethanol | 2 |
| Diethylene triamine penta methylene phosphonic acid (DTPMP) | * |
| Poly (4-vinylpyrridine N-oxide) | * |
| NaOH | up to pH 7.8 |
| Water and minors | up to 100% |

*As defined below:

Three compositions according to example II and containing respectively no DTPMP and no PVNO (A), 1% 4-PVNO (B) and 1% DTPMP (C) have been prepared and tested in launderometer under the following conditions: Temperature: 60° C., 20 min. wash hard water. Each launderometer beaker contains 200 mls of a detergent solution (0.67%), artificially soiled fabrics with tea and coffee stains, plus some cotton ballast load. Four replicate of each wash treatment were conducted. The percentage of stain removal has been evaluated by measuring the reflectance of the stained piece of fabric before and after washing.

Results:

| | A | B | C |
|---|---|---|---|
| TREATMENT | | | |
| 4-PVNO | 0% | 1% | 0% |
| Diethylene triamine penta methylene phosphonic acid | 0% | 0% | 1% |
| % STAIN REMOVAL | | | |
| Tea | 17 | 33 | 25 |
| Coffee | 12 | 16 | 14 |
| Wine | 47 | 59 | 61 |

EXAMPLE III (A/B/C/D)

Liquid detergent compositions according to the present invention are prepared, having the following compositions:

| | A | B | C | D |
|---|---|---|---|---|
| Linear alkylbenzene sulfonate | 18 | — | 6 | — |
| $C_{12}$–$C_{15}$ alkyl sulfate | — | 16.0 | — | — |
| $C_{12}$–$C_{15}$ alkyl ethoxylated | — | 11.0 | 4.0 | 25.0 |

-continued

| | A | B | C | D |
|---|---|---|---|---|
| sulfate | | | | |
| $C_{12}$–$C_{14}$ N-methyl glucamide | — | 7.0 | 9.0 | 9.0 |
| $C_{12}$–$C_{14}$ fatty alcohol ethoxylate | 12. 0 | 5.0 | 6.0 | 6.0 |
| $C_{12}$–$C_{16}$ fatty acid | 9.0 | 6.8 | 14.0 | 14.0 |
| Fatty acid | 10 | 10 | 10 | 10 |
| Oleic acid | 4 | 4 | 4 | 4 |
| Citric acid | 1 | 1 | 1 | 1 |
| Diethylene triamine pentamethylene phosphonic acid | 0.2 | 0 | 1.5 | 1 |
| Propanediol | 1.5 | 1.5 | 1.5 | 1.5 |
| Ethanol | 10 | 10 | 10 | 10 |
| Ethoxylated tetraethylene pentamine | 0.7 | 0.7 | 0.7 | 0.7 |
| Thermamyl | 0.13 | 0.13 | 0.13 | 0.13 |
| Carezyme | 0.014 | 0.014 | 0.014 | 0.014 |
| FN-Base | 1.8 | 1.8 | 1.8 | 1.8 |
| Lipolase | 0.14 | 0.14 | 0.14 | 0.1 |
| Endoglucanase A | 0.53 | 0.53 | 0.53 | 0.53 |
| Suds supressor (ISOFOL[r]) | 2.5 | 2.5 | 2.5 | 2.5 |
| Poly(4-vinylpyrridine)-N-oxide | 0.3 | 0.3 | 0.3 | 0.3 |
| Water and Minors | up to 100 | | | |
| NaOH and/or MEA to adjust pH to 7.8 | | | | |

EXAMPLE IV (A/B/C/D)

Compact granular detergent compositions according to the present invention are prepared, having the following formulation:

| | A | B | C | D |
|---|---|---|---|---|
| Polyhydroxy fatty acid amide | 10 | — | — | — |
| Alkyl alkoxylated sulfate | — | 9 | 9 | 9 |
| Alkyl sulphate | 4.80 | 4.80 | 4.80 | 4.80 |
| $C_{14-15}$ alcohol 7 times ethoxylate | 4.00 | 4.00 | 4.00 | 4.00 |
| Tallow alcohol 11 times ethoxylated | 1.8 | 1.80 | 1.8 | 1.8 |
| Dispersant | 0.07 | 0.07 | 0.07 | 0.07 |
| Silicone fluid | 0.80 | 0.80 | 0.80 | 0.80 |
| Trisodium citrate | 14.00 | 14.00 | 14.00 | 14.00 |
| Citric acid | 3.00 | 3.00 | 3.00 | 3.00 |
| Zeolite | 25.00 | 20.00 | 20.00 | 32.50 |
| Maleic acid acrylic acid copolymer | 5.00 | 5.00 | 5.00 | 5.00 |
| Carezyme T-granulate | 0.2 | 0.5 | 0.15 | 0.3 |
| Alcalase T-granulate | 0.60 | 0.60 | 0.20 | 0.50 |
| Lipolase T-granulate | 0.20 | 0.10 | 0.25 | 0.40 |
| Termamyl T-granulate | 0.3 | 0.3 | 0.3 | 0.3 |
| Sodium silicate | 2.00 | 2.00 | 2.00 | 2.00 |
| Sodium sulphate | 3.50 | 3.50 | 3.50 | 3.50 |
| Percarbonate | — | — | 20 | — |
| Perborate | 15 | 15 | — | — |
| TAED | — | 5 | 5 | — |
| Encapsulated perfume | 0.2 | — | — | — |
| Perfume | 0.3 | 0.2 | 0.3 | 0.2 |
| Poly(4-vinylpyrridine)N-oxide | 0.3 | 0.3 | 0.3 | 0.3 |
| Minors | up to 100 | | | |

What is claimed is:

1. A method of removing a pigment stain from a substrate, comprising cleaning the substrate with a detergent composition comprising polyamine N-oxide polymer formed of units having the structural formula (I):

(I)

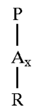

wherein P is a polymerisable unit and the N—O group may be attached to or form part of P;

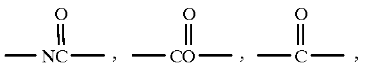

—O—, —S—, or —N—; x is 0 or 1; and R is an aliphatic, ethoxylated aliphatic, aromatic, heterocyclic or alicyclic group and the nitrogen of the N—O group may be attached to or from part of R.

2. Method according to claim 1, wherein the N—O group is attached to P and wherein R is an aromatic or heterocyclic group.

3. Method according to claim 2, wherein the nitrogen of the N—O group forms part of R.

4. Method according to claim 3, wherein R is pyridine, pyrrole, quinoline, acridine, imidazole or a derivative thereof.

5. Method according to claim 1, wherein the nitrogen of the N—O group is attached to R.

6. Method according to claim 5, wherein R is a phenyl group.

7. Method according to claim 1, wherein the N—O group forms part of P and wherein R is an aromatic or heterocyclic group.

8. Method according to claim 7, wherein the nitrogen of the N—O group forms part of R.

9. Method according to claim 8, wherein R is pyridine, pyrrole, quinoline, acridine, imidazole or a derivative thereof.

10. Method according to claim 1, wherein the polyamine N-oxide polymer comprises a polymeric backbone derived from polyvinyl polymer.

11. Method according to claim 1, wherein the polyamine N-oxide polymer comprises a ratio of amine to amine N-oxide of from 2:3 to 1:1,000,000.

12. Method according to claim 1, wherein the polyamine N-oxide has an average molecular weight within the range of from 30,000 to 50,000.

13. Method according to claim 1, wherein the detergent is a detergent additive in the form of a non-dusting granule or a liquid.

14. Method according to claim 11, wherein the ratio is from 1:4 to 1:1,000,000.

15. Method according to claim 11, wherein the ratio is from 1:7 to 1:1,000,000.

16. Method according to claim 1, wherein the substrate comprises fabric.

17. Method according to claim 1, wherein the detergent composition comprises anionic surfactant.

* * * * *